(12) United States Patent
Cameron (10) Patent No.: US 10,437,911 B2
(45) Date of Patent: Oct. 8, 2019

(54) FAST BULK Z-ORDER FOR GRAPHIC ELEMENTS

(71) Applicant: Scott Cameron, North Vancouver (CA)

(72) Inventor: Scott Cameron, North Vancouver (CA)

(73) Assignee: Business Objects Software Ltd., Dublin (IE)

( * ) Notice: Subject to any disclaimer, the term of this patent is extended or adjusted under 35 U.S.C. 154(b) by 912 days.

(21) Appl. No.: 13/918,790

(22) Filed: Jun. 14, 2013

(65) Prior Publication Data

US 2014/0372843 A1 Dec. 18, 2014

(51) Int. Cl.
*G06F 17/21* (2006.01)
*G06F 17/22* (2006.01)

(52) U.S. Cl.
CPC .......... *G06F 17/211* (2013.01); *G06F 17/218* (2013.01); *G06F 17/2247* (2013.01)

(58) Field of Classification Search
CPC ........ G06F 17/24; G06F 17/25; G06F 17/211; G06F 17/218; G06F 17/2247; G06T 11/60; A63F 2300/5553; A63F 2300/6623
USPC ................................. 715/201, 202, 230, 255
See application file for complete search history.

(56) References Cited

U.S. PATENT DOCUMENTS 5,649,183 A * 7/1997 Berkowitz ........ G06F 17/30631
5,694,561 A * 12/1997 Malamud .............. G06F 3/0481
715/805
2006/0271871 A1* 11/2006 Blaukopf .............. G06F 9/4443
715/764
2007/0005757 A1* 1/2007 Finger ..................... G06F 9/542
709/224
2009/0132907 A1* 5/2009 Shao ................... G06F 17/2247
715/234
2010/0211872 A1* 8/2010 Rolston et al. ............... 715/702
2012/0102392 A1* 4/2012 Reesman .......... G06F 17/30905
715/243
2013/0050253 A1* 2/2013 Jooste ............... G06F 17/30899
345/629
2013/0145255 A1* 6/2013 Zheng ............... G06F 17/30867
715/234
2013/0145306 A1* 6/2013 Shore ................ G06F 17/30905
715/781
2014/0047413 A1* 2/2014 Sheive et al. .................. 717/110
2014/0245126 A1* 8/2014 Sharma ............... G06F 17/2247
715/234

* cited by examiner

*Primary Examiner* — Andrew R Dyer
*Assistant Examiner* — Jenq-Kang Chu
(74) *Attorney, Agent, or Firm* — Schwegman Lundberg & Woessner, P.A.

(57) ABSTRACT

A plurality of graphical elements may be represented as a document object model (DOM) having a plurality of nodes, each node representing a different graphical element, the DOM having an ordering of the nodes, each node having a z-value of front or back, indicating that the corresponding graphical element is to be displayed in a front layer for a z-value of front or a back layer for a z-value of back. The z-value of one or more of the plurality of nodes corresponding to one or more graphical elements to be moved to the front layer or back layer may be altered. The DOM can then be reordered so that the one or more graphical elements to be moved to the front layer or back layer are at the front or back of the DOM, while maintaining the ordering between nodes having z-values of front and the ordering between nodes having z-values of back.

20 Claims, 11 Drawing Sheets

FAST BULK Z-ORDER FOR GRAPHIC ELEMENTS

TECHNICAL FIELD

This document generally relates to methods and systems for use with computer graphics

BACKGROUND

Scalable Vector Graphics (SVG) is a vector image format for two-dimensional graphics. It is widely supported by modern web browsers and is fully integrated into the browser document object model (DOM), along with other technologies such as Hypertext Markup Language (HTML) and Cascading Style Sheets (CSS). In SVG, in contrast to how location relative the x-axis and y-axis is explicitly expressed there is no precise way to express location on the z-axis of an image. Indeed, there is no concept of z-order, meaning depth of elements. Image elements are simply layered on top of one another in the order they are encountered in the DOM. This does not present a problem for many web applications, which involve merely presenting graphics to a user. However, recently more web applications have permitted interactivity with the graphics. Such interactivity is limited, however, by the lack of an ability to move an image element along the z-axis.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

In an example embodiment, a bulk z-order change is made on a large number of SVG DOM elements in a manner that allows for satisfactory performance in a user interface-based web application. This allows elements to be "brought to front" or "sent to back" by a user of a web application. An example embodiment attempts to minimize the number of DOM elements moved while still maintaining the original relative order of the DOM elements, independent of the new z-order. For example, if five elements are all brought to the front together, then those five elements maintain the same positions relative to each other, even though all five of them are now in front of all other elements in the DOM.

In an example embodiment, these goals are achieved using specialized sorting techniques. Normally sorting techniques are optimized by reducing the number of required searches, even if it means performing more node swapping. In an example embodiment, because node swapping is relatively expensive, sorting techniques are utilized that attempt to minimize the number of swaps even if more searching and state management is called for.

Figure 1:
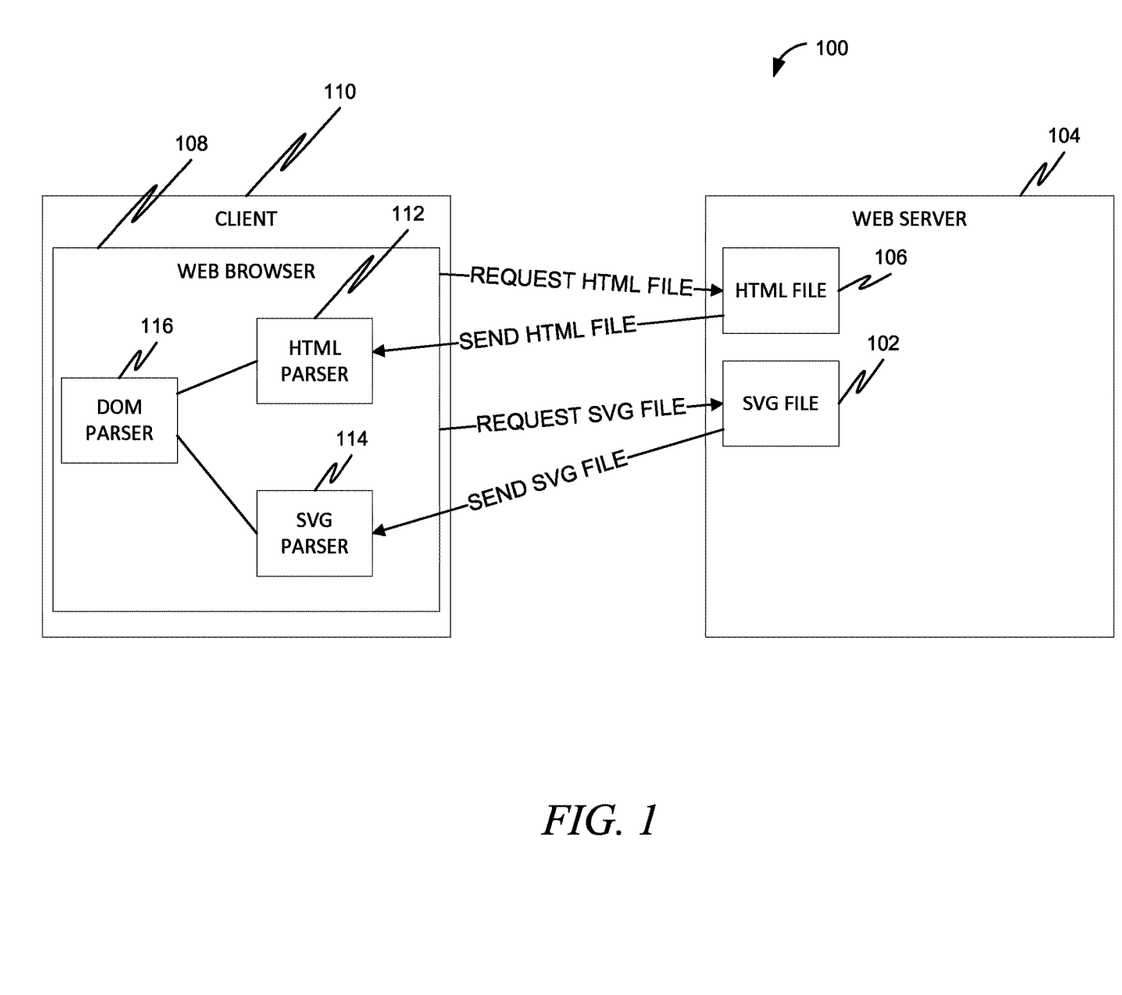
FIG. 1 is a block diagram illustrating a system utilizing SVG elements.

FIG. 1 is a block diagram illustrating a system 100 utilizing SVG elements. The SVG elements are saved within an SVG file 102 stored on a web server 104. The web server 104 also stores a web file, such as an HTML file 106 that references the SVG file 102. When a user operates a web browser 108 on a client 110 to an address of the HTML file 106, the HTML file 106 is transferred from the web server 104 to the web browser 108. The web browser 108 may then use a web parser, such as an HTML parser 112, to parse the HTML file 106. Through this parsing, the web browser 108 may discover that the HTML file 106 references the SVG file 102, and may then request the SVG file 102 from the web server 104. The web browser 108 may then utilize an SVG parser 114 to parse the SVG file 102. This may include utilizing a DOM parser 116 to parse the SVG file 102 into a DOM, also known as a DOM tree.

Figure 2:
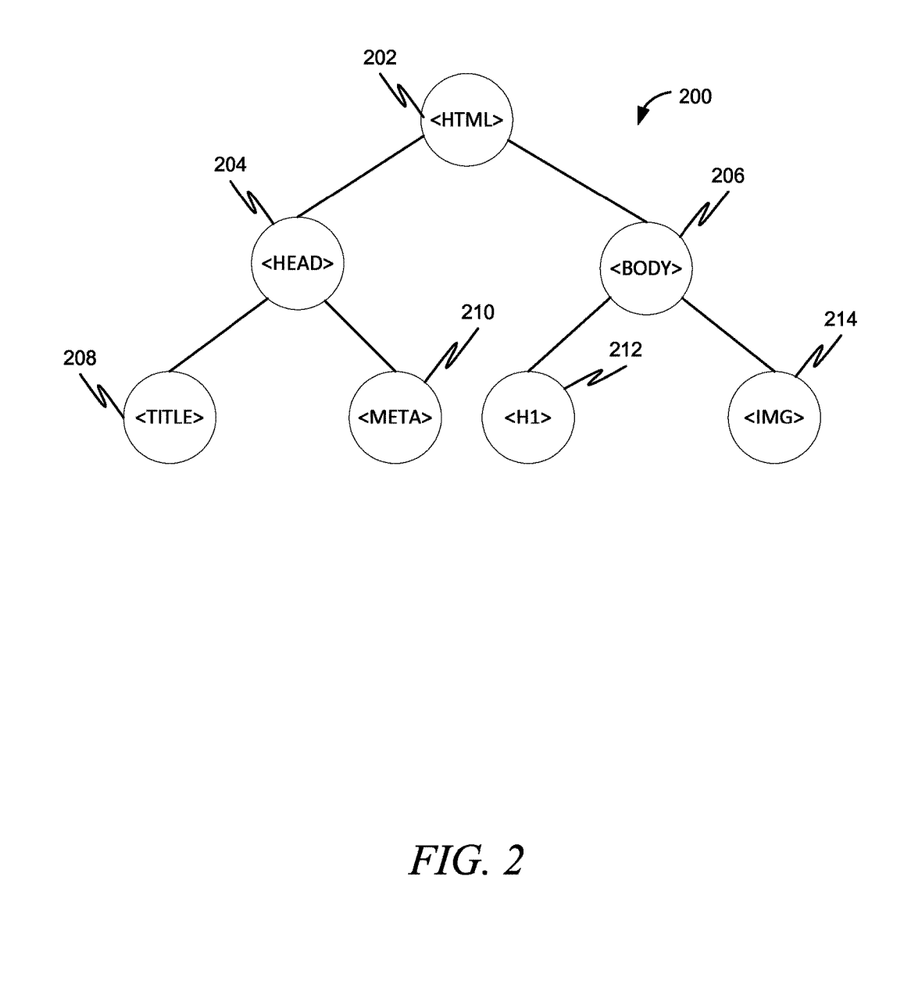
FIG. 2 is a diagram illustrating an example DOM tree for an HTML file.

A DOM, or DOM tree, is a data structure that represents elements of the underlying file as nodes in the tree. Elements nested within other elements are represented as different levels in the tree. FIG. 2 is a diagram illustrating an example DOM tree 200 for an HTML file. A top level node 202 may represent the top level element (HTML) for the file. A next level may contain nodes 204, 206 representing elements nested within the top level element. The next level may contain nodes 208, 210, 212, 214 that are nested within the elements represented by nodes 204 and 206, and so forth.

Figure 3:
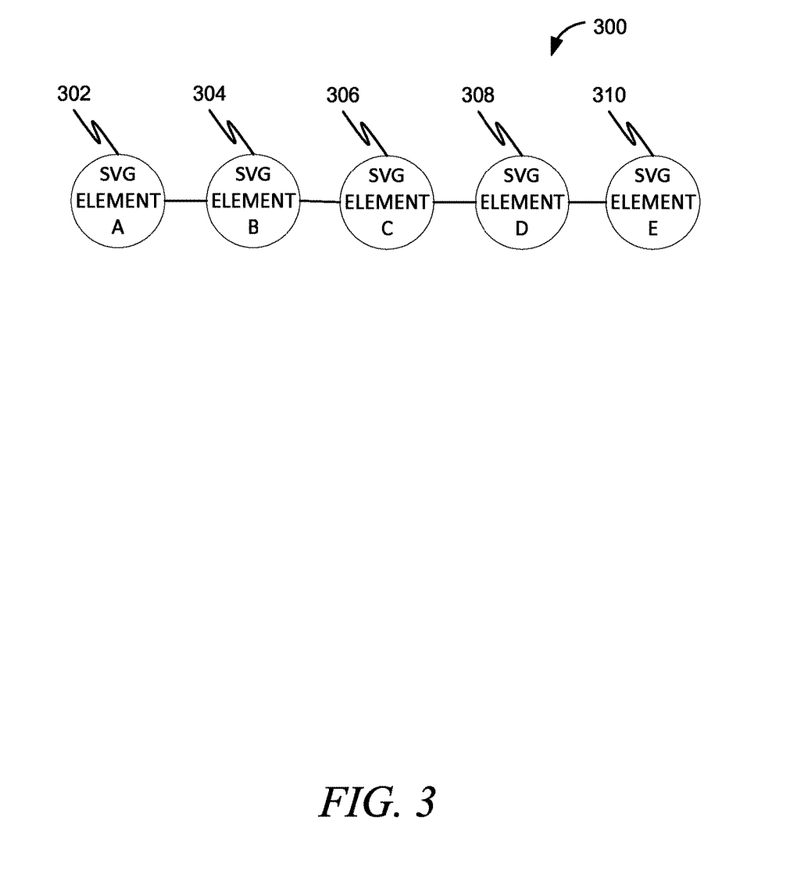
FIG. 3 is a diagram illustrating an example of a DOM based on an SVG file.

The rules of SVG, however, provide that any nested elements within a particular element should be rendered prior to any nested elements within a next element in the SVG file. As such, a DOM for an SVG file really can be viewed as a series of DOMs, one for each parent element, containing nodes representing the siblings underneath that parent. As such, the DOMs wind up resembling linked lists more than trees (the list being all the siblings underneath a particular parent). FIG. 3 is a diagram illustrating an example of a DOM 300 based on an SVG file. Each sibling SVG element is represented by a node 302-310. When rendering the SVG file, the system typically will simply start at the first node 302 of a particular DOM and traverse through the linked list, rendering each SVG element as it encounters it.

Figure 4:
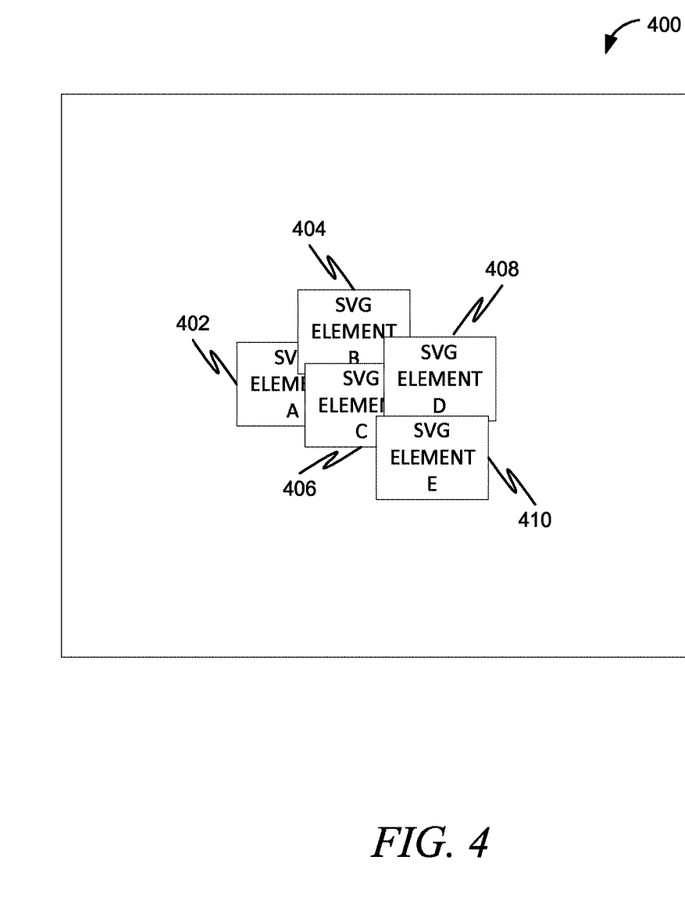
FIG. 4 is a diagram illustrating an example screen capture of a rendered SVG file.

FIG. 4 is a diagram illustrating an example screen capture 400 of a rendered SVG file. Here, each element represented by the nodes 302-310 of FIG. 3 are rendered as a separate graphics element 402-410. As can be seen, element 404 has been overlaid on top of element 402, because node 304 follows node 302 in the DOM of FIG. 3. Likewise, element 406 has been overlaid on top of element 404 because node 306 follows node 304 in the DOM of FIG. 3.

A user, however, may wish to see one or more of the elements 402-410, such as element 402, more prominently, and thus may desire to bring elements "to the front." Likewise, a user may wish to see one or more of the elements 402-410, such as element 410, less prominently and thus may wish to send it "to the back."

It should be noted that FIGS. 3 and 4 represent a very simple case of an SVG file. In practice, many SVG files can contain tens, hundred, or even thousands of SVG elements.

In an example embodiment, sibling elements within a SVG DOM are broken into two main groups: a "front" group and a "back" group. Within each group, the elements are ordered by sort criteria. This sort criteria may be maintained as elements move from the "back" group to the "front" group and vice-versa.

In an example embodiment, a process of bulk change in z-order is combined with changing individual elements (i.e., non-bulk changes) to enable high performance interactive functionality. This recognizes that with a small number of elements changed, performing the changes in bulk may be less efficient than changing the elements individually. One of ordinary skill in the art will recognize, however, that the bulk change in z-order could also be performed for every change in z-order in some embodiments.

Figure 5:
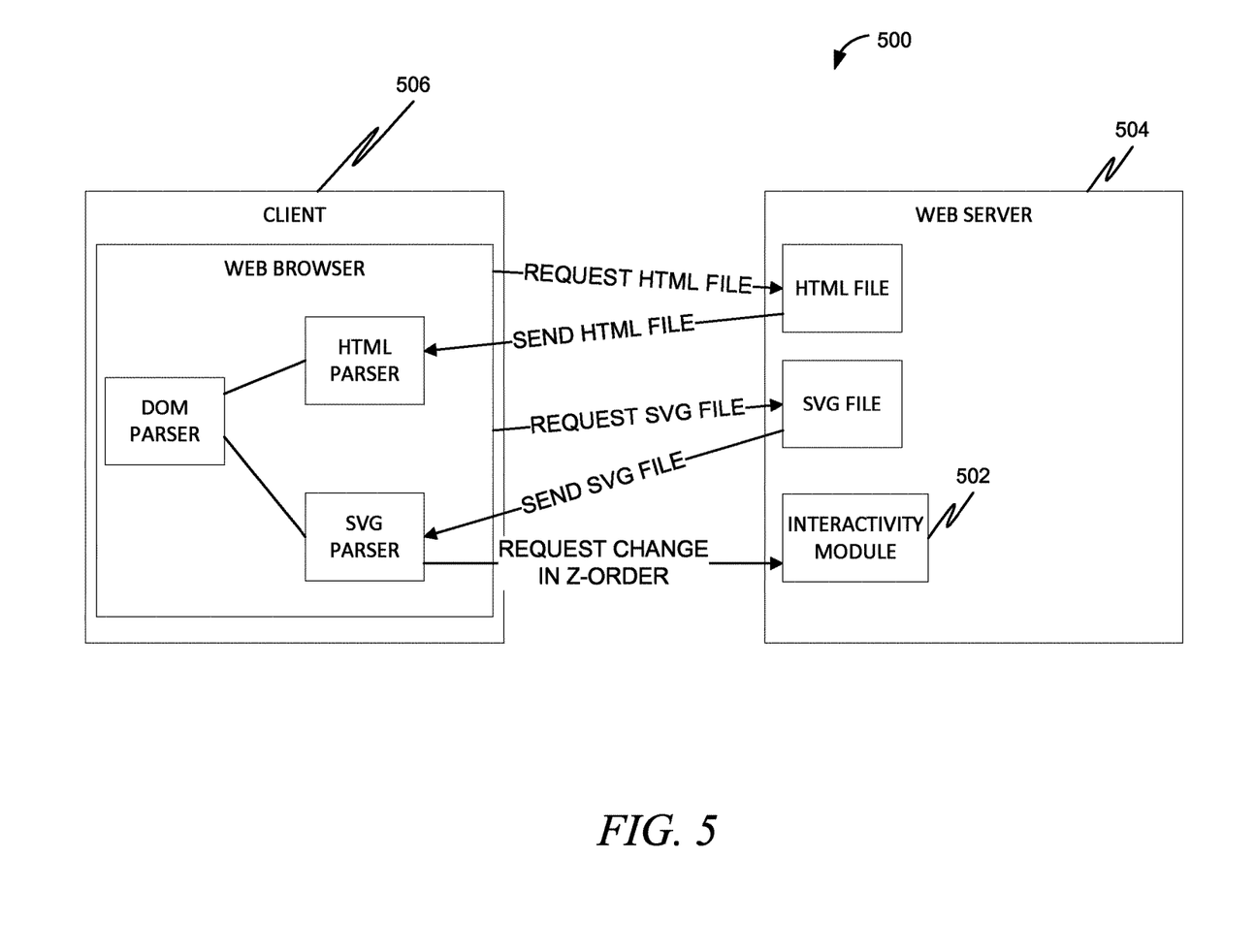
FIG. 5 is a block diagram illustrating a system, in accordance with an example embodiment, utilizing SVG elements.

In an example embodiment, this process may be implemented in an interactivity module located on a web server. FIG. 5 is a block diagram illustrating a system 500, in accordance with an example embodiment, utilizing SVG elements. Here, an interactivity module 502 located on web server 504 can interact with one or more clients 506 to change SVG elements of the SVG file to move those elements to the front or to the back. This may be performed in response to requests from the one or more clients 506 to do so.

It should be noted that an interactivity module 502 on a web server 504 is merely one example of where the process may be implemented. Embodiments are foreseen where other components on a server are used, and additionally client-based implementations are also foreseen.

Figure 6:
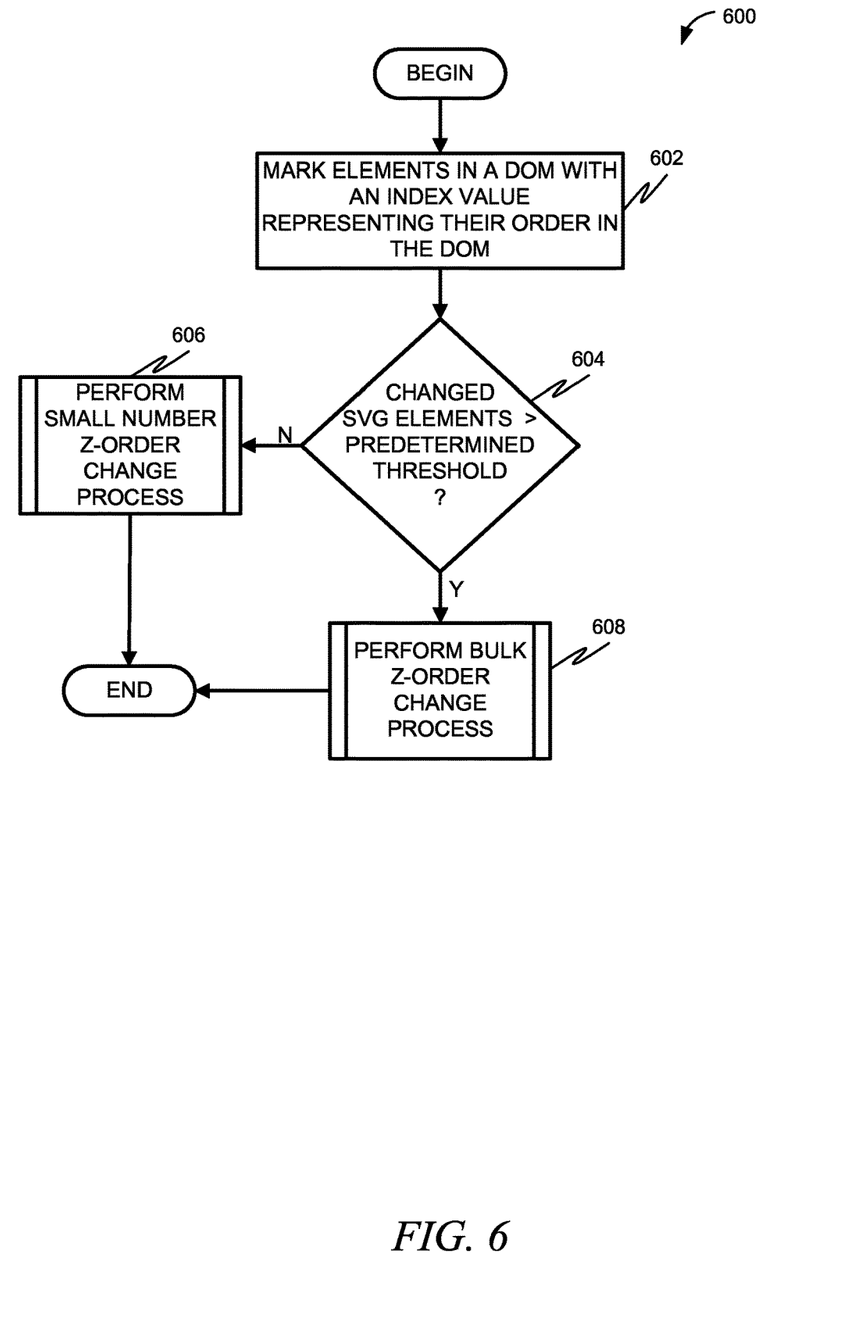
FIG. 6 is a flow diagram illustrating a method, in accordance with an example embodiment, of changing a z-order of one or more SVG elements.

FIG. 6 is a flow diagram illustrating a method 600, in accordance with an example embodiment, of changing a z-order of one or more SVG elements. At operation 602, SVG elements in a DOM are marked with an index value representing their order in the DOM. This order will basically represent their "original order," prior to any change in the z-order. At operation 604, it is determined if a number of SVG elements to have their z-order changed is greater than a predetermined threshold. The predetermined threshold is selected so that the number of elements above the threshold is considered to be a "large number" of SVG elements to have their z-order changed. In an example embodiment, this predetermined threshold may be 50, although one of ordinary skill in the art will recognize that this threshold may change depending upon implementation, as well as based on the total number of sibling elements. In an example embodiment, this predetermined threshold may be about 50, where about means plus or minus 40 percent.

If the number of SVG elements to have their z-order changed is less than or equal to the predetermined threshold, then at operation 606, a small number z-order change process is performed. This process will be described in more detail with reference to FIG. 7 below.

If the number of SVG elements to have their z-order changed is greater than the predetermined threshold, then at operation 608, a bulk z-order change process is performed. This process will be described in more detail with reference to FIG. 8 below.

It should also be noted that while these techniques are well suited to SVG elements in a web browser, they can also be generalized to any system where the cost of physically moving elements in a list outweighs the cost of other read-only operations such as iteration and look-up.

Figure 7:
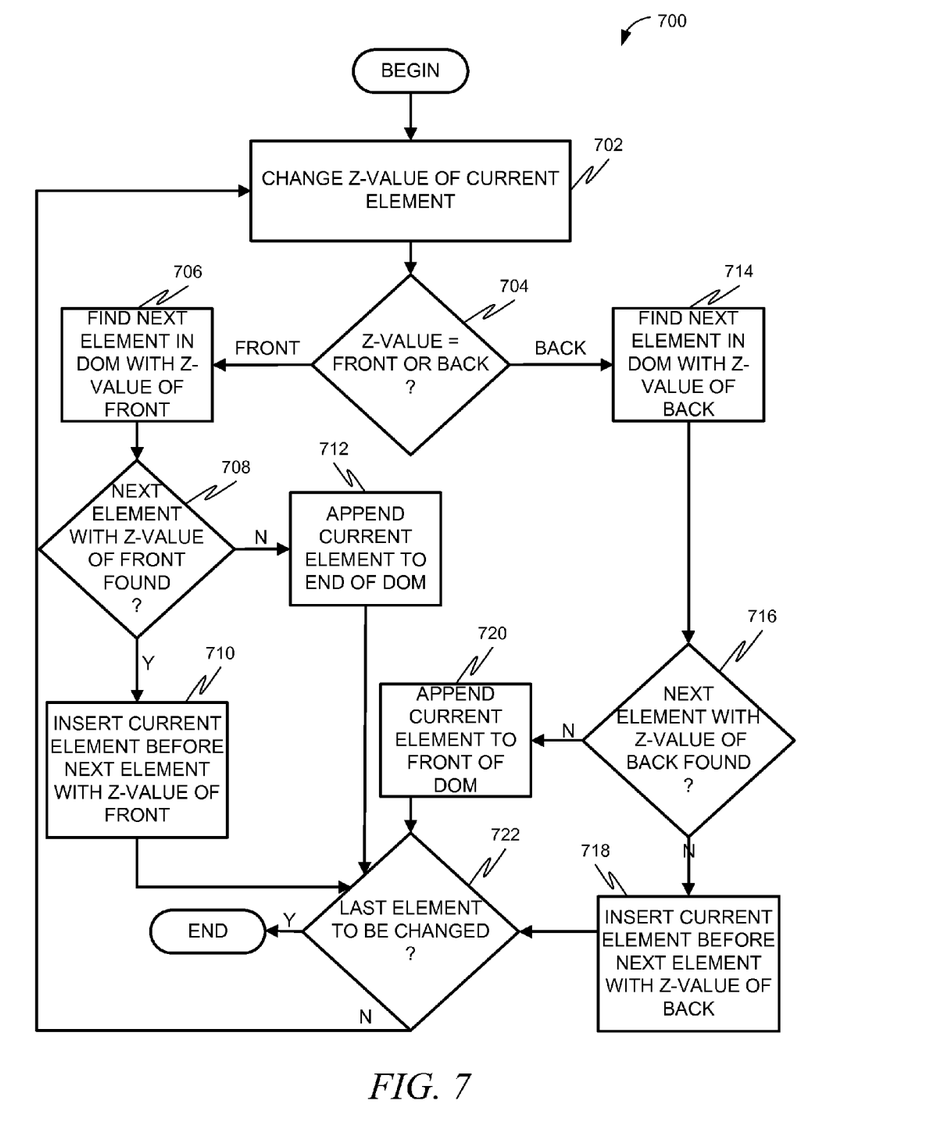
FIG. 7 is a flow diagram illustrating a method, in accordance with an example embodiment, of performing a z-order change on a small number of SVG elements.

FIG. 7 is a flow diagram illustrating a method 700, in accordance with an example embodiment, of performing a z-order change on a small number of SVG elements. FIG. 7 represents operation 606 of FIG. 6 in more detail. This process operates on each individual element that needs to be moved from one z-order group to another in the current location based on its index. This option incurs less initial set-up overhead, but is more expensive per element. This is why the process is useful when a small number of overall elements are being changed. This process uses metadata about the elements that was added during the preprocessing operation, namely operation 602 of FIG. 6, in order to make a fast decision as to where to place the element relative to other elements. This process will iterate through each element being changed, at each iteration using the element as well as a list of sibling elements.

As described earlier, each element can be considered to be a "front" group or a "back" group. This attribute of an element may be termed its "z-value."

At operation 702, the z-value of the current element is changed. Thus, if the z-value was "back" it is changed to "front," and vice-versa. At operation 704, the z-value of the current element is examined. If the z-value is "front", then at operation 706 the next element in the DOM with a z-value of "front" is attempted to be found. At operation 708, it is determined if a next element in the DOM with a z-value of "front" was found. If so, then at operation 710 the current element is inserted before that found next element having a z-value of "front." If no such next element is found, then at operation 712, the current element is appended to the end of the DOM.

If at operation 704 it was determined that the z-value of the current element is "back," then at operation 714 the next element in the DOM with a z-value of "back" is attempted to be found. At operation 716, it is determined if a next element in the DOM with a z-value of "back" was found. If so, then at operation 718 the current element is inserted before that next element having a z-value of "back." If no such next element is found, then at operation 720, the current element is appended to the front of the DOM.

At operation 722, it is determined if this is the last element to be changed. If not, then the process iterates back up to operation 702 using the next element to be changed as the current element.

In an example embodiment, the "find" operation in this routine utilizes a linked list defined by the "next" property in pre-processing index information. This uses the knowledge that the linked list maintains the original order regardless of z-order. This process, therefore, does incur a linear time search cost for each changed element, but has no additional overhead or specialized data structures beyond the basic pre-processing information. As such, it is a good choice for a small number of operations.

The following represents example pseudo code for FIG. 7:

```
Function repositionNode(changedNode,
allNodes)
    Set Z to the current "z" value of
changedNode.
    If Z is "front" Then
        Find next node in allNodes with "z"
value of "front".
        If next node is found Then
            Insert changedNode before next
node.
        Else
            Append changedNode to end.
    Else
        Find next node in allNodes with "z"
value of "back".
        If next node is found Then
            Insert changedNode before next
node.
        Else
            Insert changedNode before first
"front" node.
End Function
```

Figure 8:
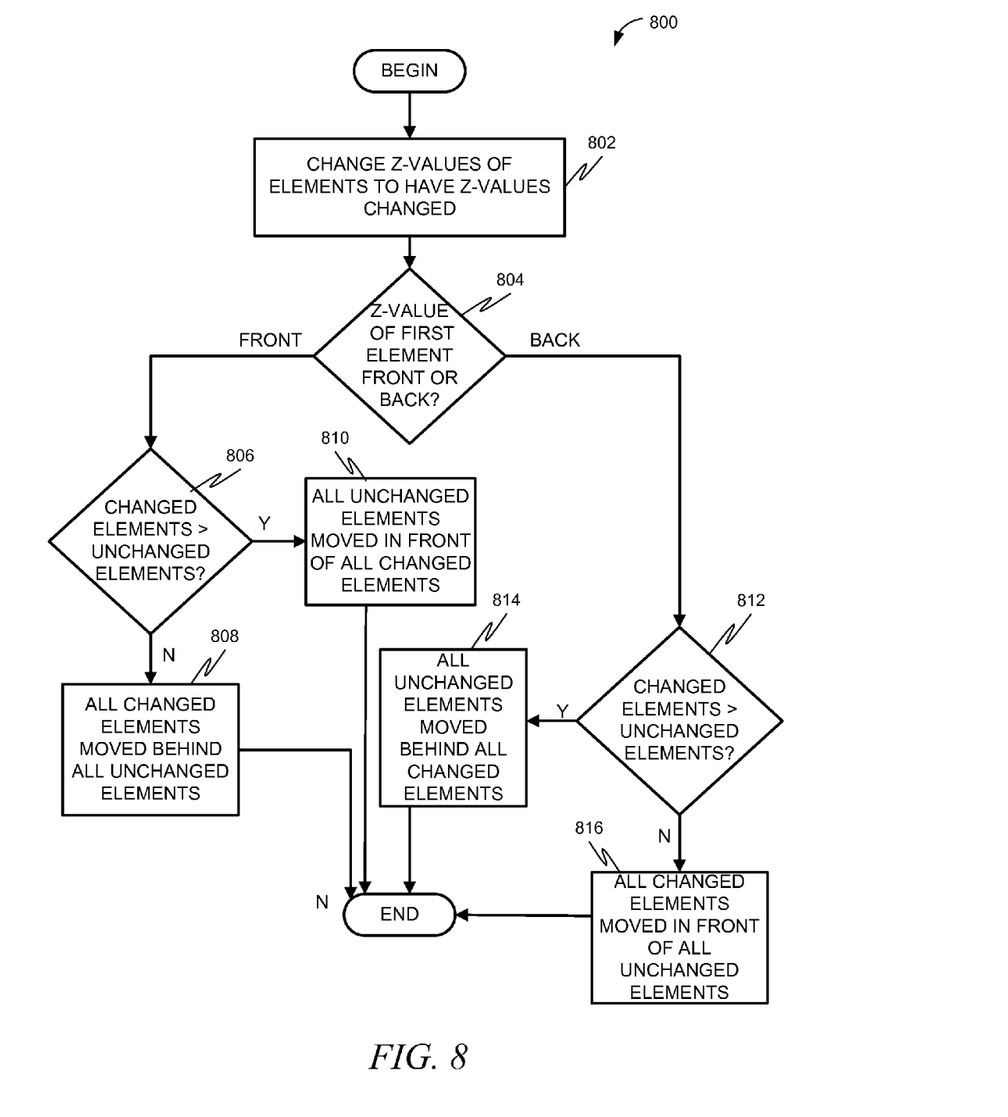
FIG. 8 is a flow diagram illustrating a method, in accordance with an example embodiment, of performing a bulk z-order change on a large number of SVG elements.

FIG. 8 is a flow diagram illustrating a method 800, in accordance with an example embodiment, of performing a bulk z-order change on a large number of SVG elements. When such a large number of SVG elements are to have their z-value changed, a highly optimized process may be used. This process incurs more initial overhead to set up, but minimizes the number of DOM changes and therefore provides higher performance when more elements need to have their z-value changed.

This process takes as input a list of elements having z-values to be changed along with a list of all sibling nodes. This process basically answers the question "is it better to move the changed elements around the unchanged elements, or is it better to move the unchanged elements around the changed elements?"

At operation 802, the z-values for all the SVG elements to have their z-values changed are changed. Thus, if they are currently "back" they are changed to "front," and vice-versa. At operation 804, it is determined if the z-value of a first element in the list of elements to have their values changed is front or back. In an example embodiment the first element may be the first element in order in the list. However, this is not strictly necessary, as any element in the list can be used. As such, the term "first element" shall not be interpreted to require any particular ordering or position of the element.

If the z-value of the first element is "front", then at operation 806 it is determined if the number of elements to have their z-value changed is greater than the number of elements not to have their z-value changed. If not, then at operation 808, all the elements to have their z-value changed are moved behind all the elements not to have their z-value changed. If so, then at operation 810, all the elements not to have their z-value changed are moved in front of all the elements to have their z-value changed.

If at operation 804 it was determined that the z-value of the first element is "back," then at operation 812 it is determined if the number of elements to have their z-value changed is greater than the number of elements not to have their z-value changed. If so, then at operation 814, all the elements to have their z-value changed are moved in front of all the elements not to have their z-value changed. If not,
then at operation 816, all the elements not to have their z-value changed are moved behind all the elements to have their z-value changed.

The following represents example pseudo code for FIG. 8:

```
Function bulkOrder(changedNodes, allNodes)
    Set unchangedNodes to subset of allNodes
that are not in changedNodes
    Set sampleZ to "z" value of first node
in changedNodes
    If sampleZ is "front" Then
        If changedNodes length >
unchangedNodes length Then
            Call
bulkOrderSendToBack(unchangedNodes,
changedNodes)
        Else
            Call
bulkOrderBringToFront(changedNodes,
unchangedNodes)
    Else
        If changedNodes length >
unchangeNodes length Then
            Call
bulkOrderBringToFront(unchangedNodes,
changedNodes)
        Else
            Call
bulkOrderSendToBack(changedNodes,
unchangedNodes)
End Function
Function bulkOrderBringToFront(activeNodes,
fixedNodes)
    Set currentFixed to last element in
fixedNodes
    Iterate through activeNodes from last
element to first
        While "z" of currentFixed is "front"
                and "index" of currentActive <
"index" of currentFixed
            Set currentFixed to previous
element in fixedNodes
            If there is no previous element
Then Exit While
        End While
        Insert currentActive node
immediately after currentFixed
    End Iterate
End Function
Function bulkOrderSendToBack(activeNodes,
fixedNodes)
    Set currentFixed to first element in
fixedNodes
    Iterate through activeNodes from first
element to last
        While "z" of currentFixed is "back"
                And "index" of currentActive >
"index" of currentFixed
            Set currentFixed to next element
in fixedNodes
            If there is no next element Then
Exit While
        End While
        Insert currentActive node
immediately before currentFixed
    End Iterate
End Function
```

Figure 9:
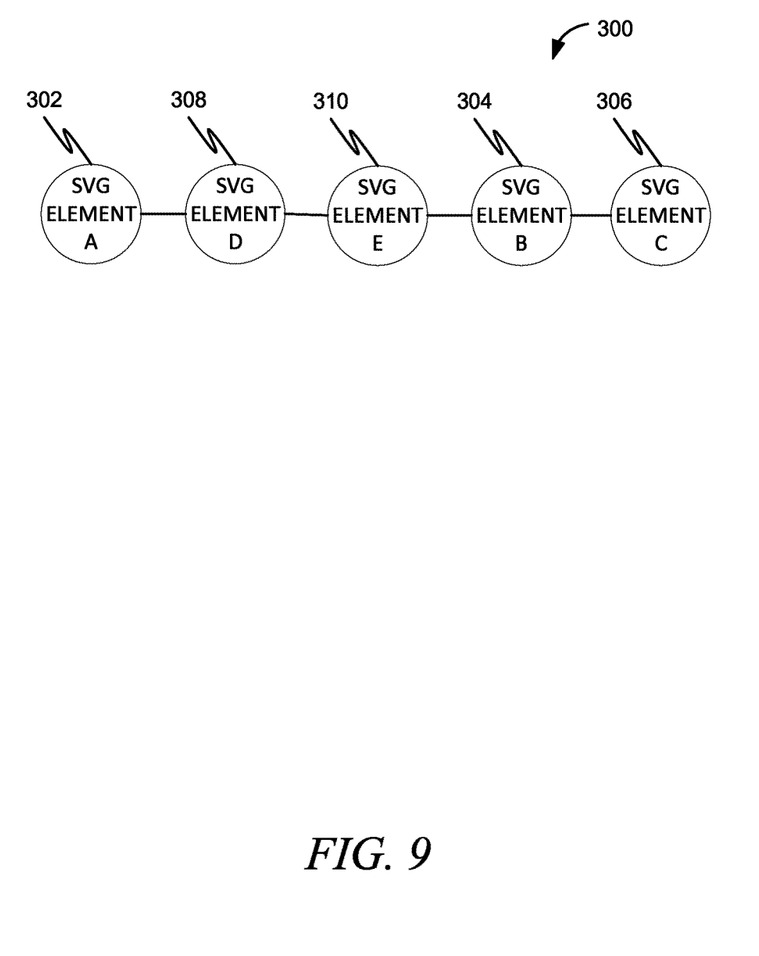
FIG. 9 is a diagram illustrating a revised DOM in accordance with an example embodiment.

As an example, suppose that elements 404 and 406 of FIG. 4 are to be sent to the front. Assume that previously all elements 402-410 were at the back. The result of either the non-bulk process of FIG. 7, or the bulk process of FIG. 8, is a revised DOM tree in which elements 404 and 406 are inserted at the end of the DOM. FIG. 9 is a diagram illustrating a revised DOM in accordance with an example embodiment. FIG. 9 represents a revised version of FIG. 3. The DOM 300 has been modified so that the nodes 304 and 306 now are at the end, preceded by nodes 302, 308, and 310. As such, nodes 302, 308, and 310 will be rendered prior to elements 304 and 306.

Figure 10:
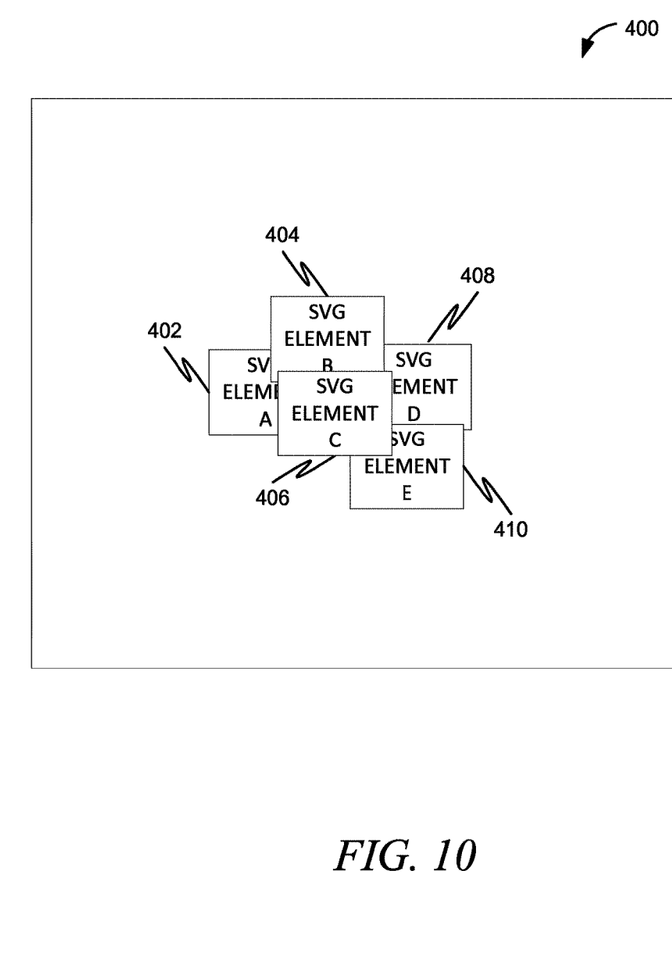
FIG. 10 is a diagram illustrating an example screen capture of a revised rendered SVG file.

FIG. 10 is a diagram illustrating an example screen capture 400, in accordance with an example embodiment, of a revised rendered SVG file. Here, the DOM 300 of FIG. 9 has been rendered, providing a revised version of FIG. 4, and now it can be seen that elements 404 and 406 have been rendered after elements 402, 408, and 410, making elements 404 and 406 more visible by bringing them to the front.

In a first example embodiment, a computer implemented method of altering ordering elements in a data structure can include representing a plurality of elements as a document object model (DOM) having a plurality of nodes, each node representing a different element, the DOM having an ordering of the nodes, each node having a z-value of front or back, indicating that a corresponding element is to be displayed in a front layer for a z-value of front or a back layer for a z-value of back. Then the z-value of one or more of the plurality of nodes corresponding to one or more elements can be altered to be moved to the front layer or back layer. Then DOM can then be reordered so that the one or more elements to be moved to the front layer or back layer are all at the front or back of the DOM, while maintaining the ordering between nodes having z-values of front and the ordering between nodes having z-values of back.

Figure 11:
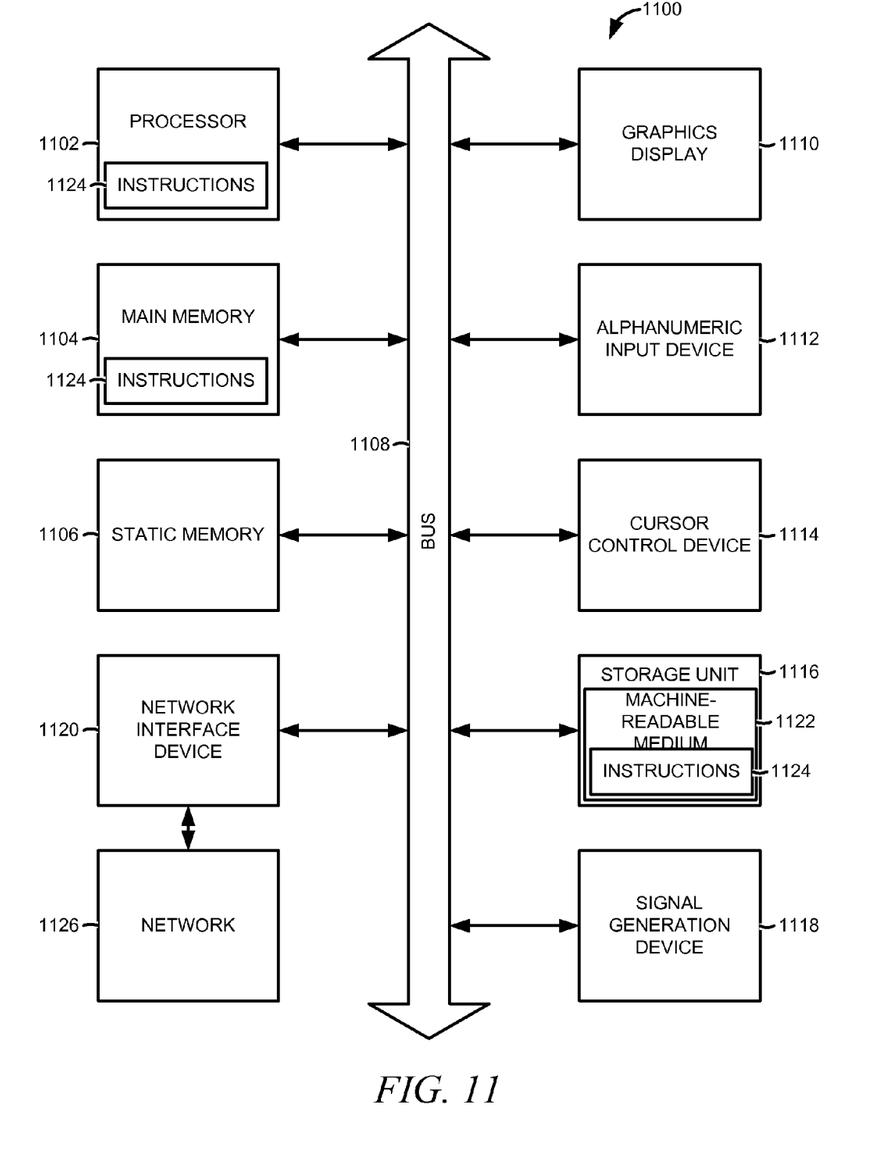
FIG. 11 is a block diagram of a computer processing system at a server system, within which a set of instructions may be executed for causing the computer to perform any one or more of the methodologies discussed herein.

FIG. 11 is a block diagram of a computer processing system 1100 at a server system, within which a set of instructions 1124 may be executed for causing the computer to perform any one or more of the methodologies discussed herein.

Embodiments may also, for example, be deployed by Software-as-a-Service (SaaS), application service provider (ASP), or utility computing providers, in addition to being sold or licensed via traditional channels. The computer may be a server computer, a personal computer (PC), a tablet PC, a set-top box (STB), a personal digital assistant (PDA), cellular telephone, or any processing device capable of executing a set of instructions (sequential or otherwise) that specify actions to be taken by that device. Further, while only a single computer is illustrated, the term "computer" shall also be taken to include any collection of computers that individually or jointly execute a set (or multiple sets) of instructions to perform any one or more of the methodologies discussed herein.

The example computer processing system 1100 includes processor 1102 (e.g., a central processing unit (CPU), a graphics processing unit (GPU) or both), main memory 1104 and static memory 1106, which communicate with each other via bus 1108. The processing system 1100 may further include graphics display unit 1110 (e.g., a plasma display, a liquid crystal display (LCD) or a cathode ray tube (CRT)). The processing system 1100 also includes alphanumeric input device 1112 (e.g., a keyboard), a cursor control device 1114 (e.g., a mouse, touch screen, or the like), a storage unit 1116, a signal generation device 1118 (e.g., a speaker), and a network interface device 1120.

The storage unit 1116 includes machine-readable medium 1122 on which is stored one or more sets of instructions 1124 and data structures (e.g., software) embodying or utilized by any one or more of the methodologies or functions described herein. The instructions 1124 may also reside, completely or at least partially, within the main memory 1104 and/or within the processor 1102 during execution thereof by the processing system 1100, the main memory 1104 and the processor 1102 also constituting machine-readable, tangible media.

The instructions 1124 may further be transmitted or received over network 1126 via a network interface device 1120 utilizing any one of a number of well-known transfer protocols (e.g., HTTP).

While the machine-readable medium 1122 is shown in an example embodiment to be a single medium, the term "machine-readable medium" should be taken to include a single medium or multiple media (e.g., a centralized or distributed database, and/or associated caches and servers) that store the one or more sets of instructions 1124. The term "machine-readable medium" shall also be taken to include any medium that is capable of storing, encoding or carrying a set of instructions for execution by the computer and that cause the computer to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, and optical and magnetic media.

While various implementations and exploitations are described, it will be understood that these embodiments are illustrative and that the scope of the claims is not limited to them. In general, techniques for maintaining consistency between data structures may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims.

What is claimed is:

1. A method of altering ordering of graphical elements to be presented on a display, the method comprising:
representing a plurality of graphical elements as a document object model (DOM) having a plurality of nodes, each node representing a different graphical element, the DOM having an ordering of the nodes, each node having a z-value field assigned a value of either front or back, indicating that a corresponding graphical element is to be displayed in a front layer for a z-value of front or a back layer for a z-value of back;
altering the value in the z-value field of a plurality of nodes having a z-value of back to have a z-value of front; and
reordering the DOM so that the plurality of nodes having altered values in their respective z-value fields are at the front of the DOM, in front of any nodes having an unaltered value of front in their corresponding z-value fields, while maintaining relative ordering among the plurality of nodes having altered values in their respective z-value fields.

2. The method of claim 1, wherein the graphical elements are scalable vector graphics (SVG) elements.

3. The method of claim 1, further comprising:
determining whether a number of the one or more of the plurality of nodes corresponding to one or more graphic elements to be moved to the front layer or back layer exceeds a predetermined threshold; and
in response to a determination that the number does not exceed the predetermined threshold, reordering the DOM one node at a time.

4. The method of claim 1, further comprising:
determining whether a number of the one or more of the plurality of nodes corresponding to one or more graphic elements to be moved to the front layer or back layer exceeds a predetermined threshold; and
in response to a determination that the number exceeds the predetermined threshold, reordering the DOM nodes in bulk.

5. The method of claim 1, wherein the reordering includes:
determining whether the value in the z-value field of the one or more of the plurality of nodes corresponding to one or more graphic elements to be moved is front or back;
in response to a determination that the value in the z-value field of the one or more of the plurality of nodes corresponding to one or more graphic elements to be moved is front:
determining if a number of the one or more plurality of nodes corresponding to the one or more graphic elements to be moved is greater than a remainder of the nodes; and
in response to a determination that the number of the one or more plurality of nodes corresponding to the one or more graphic elements to be moved is greater than a remainder of the nodes, moving the remainder of nodes in front of the one or more plurality of nodes corresponding to the one or more graphic elements to be moved.

6. The method of claim 1, wherein the reordering includes:
determining whether the value in the z-value field of the one or more of the plurality of nodes corresponding to the one or more graphic elements to be moved is front or back;
in response to a determination that the value in the z-value field of the one or more of the plurality of nodes corresponding to the one or more graphic elements to be moved is front:
determining if a number of the one or more plurality of nodes corresponding to the one or more graphic elements to be moved is greater than a remainder of the nodes; and
in response to a determination that the number of the one or more plurality of nodes corresponding to the one or more graphic elements to be moved is not greater than the remainder of the nodes, moving the one or more plurality of nodes corresponding to the one or more graphic elements to be moved in front of the remainder of nodes.

7. The method of claim 1, wherein the reordering includes:
determining whether the value in the z-value field of the one or more of the plurality of nodes corresponding to the one or more graphic elements to be moved is front or back;
in response to a determination that the value in the z-value field of the one or more of the plurality of nodes corresponding to the one or more graphic elements to be moved is back:
determining if a number of the one or more plurality of nodes corresponding to the one or more graphic elements to be moved is greater than a remainder of the nodes; and
in response to a determination that the number of the one or more plurality of nodes corresponding to the one or more graphic elements to be moved is greater than the remainder of the nodes, moving the remainder of nodes behind the one or more plurality of nodes corresponding to the one or more graphic elements to be moved.

8. The method of claim 1, wherein the reordering includes:
determining whether the value in the z-value field of the one or more of the plurality of nodes corresponding to the one or more graphic elements to be moved is front or back;
in response to a determination that the value in the z-value field of the one or more of the plurality of nodes corresponding to the one or more graphic elements to be moved is front:
determining if a number of the one or more plurality of nodes corresponding to the one or more graphic elements to be moved is greater than a remainder of the nodes; and
in response to a determination that the number of the one or more plurality of nodes corresponding to the one or more graphic elements to be moved is not greater than the remainder of the nodes, moving the one or more plurality of nodes corresponding to the one or more graphic elements to be moved behind the remainder of nodes.

9. A system comprising:
a processor operating a DOM parser;
the DOM parser configured to represent a plurality of graphical elements as a document object model (DOM) having a plurality of nodes, each node representing a different graphical element, the DOM having an ordering of the nodes, each node having a z-value field assigned a value of either front or back, indicating that a corresponding graphical element is to be displayed in a front layer for a value in the z-value field of front or a back layer for a value in the z-value field of back;
the processor configured to:
alter the value in the z-value field of a plurality of nodes having a z-value of back to have a z-value of front; and
reorder the DOM so that the plurality of nodes having altered values in their respective z-value fields are at the front of the DOM, in front of any nodes having an unaltered value of front in their corresponding z-value fields, while maintaining relative ordering among the plurality of nodes having altered values in their respective z-value fields.

10. The system of claim 9, wherein the processor module is located on a web server.

11. The system of claim 10, wherein the web server communicates with a browser on a web client, the browser rendering graphics based on the reordered DOM.

12. The system of claim 11, wherein the processor is located on a client device operating a web browser.

13. A non-transitory computer-readable storage medium comprising instructions that, when executed by at least one processor of a machine, cause the machine to perform operations of altering ordering of graphical elements to be presented on a display, including:

representing a plurality of graphical elements as a document object model (DOM) having a plurality of nodes, each node representing a different graphical element, the DOM having an ordering of the nodes, each node having a z-value field assigned a value of either front or back, indicating that a corresponding graphical element is to be displayed in a front layer for a z-value of front or a back layer for a z-value of back;

altering the value in the z-value field of a plurality of nodes having a z-value of back to have a z-value of front; and reordering the DOM so that the plurality of nodes having altered values in their respective z-value fields are at the front of the DOM, in front of any nodes having an unaltered value of front in their corresponding z-value fields, while maintaining relative ordering among the plurality of nodes having altered values in their respective z-value fields.

14. The non-transitory computer-readable storage medium of claim 13, wherein the graphical elements are scalable vector graphics (SVG) elements.

15. The non-transitory computer-readable storage medium of claim 13, wherein the operations further comprise:

determining whether a number of the one or more of the plurality of nodes corresponding to the one or more graphic elements to be moved to the front layer or back layer exceeds a predetermined threshold; and in response to a determination that the number does not exceed the predetermined threshold, reordering the DOM one node at a time.

16. The non-transitory computer-readable storage medium of claim 13, wherein the operations further comprise:

determining whether a number of the one or more of the plurality of nodes corresponding to the one or more graphic elements to be moved to the front layer or back layer exceeds a predetermined threshold; and in response to a determination that the number exceeds the predetermined threshold, reordering the DOM nodes in bulk.

17. The non-transitory computer-readable storage medium of claim 13, wherein the operations further comprise:

determining whether the value in the z-value field of the one or more of the plurality of nodes corresponding to one or more graphic elements to be moved is front or back;

in response to a determination that the value in the z-value field of the one or more of the plurality of nodes corresponding to one or more graphic elements to be moved is front:

determining if a number of the one or more plurality of nodes corresponding to the one or more graphic elements to be moved is greater than a remainder of the nodes; and in response to a determination that the number of the one or more plurality of nodes corresponding to the one or more graphic elements to be moved is greater than a remainder of the nodes, moving the remainder of nodes in front of the one or more plurality of nodes corresponding to the one or more graphic elements to be moved.

18. The non-transitory computer-readable storage medium of claim 13, wherein the operations further comprise:

determining whether the value in the z-value field of the one or more of the plurality of nodes corresponding to the one or more graphic elements to be moved is front or back;

in response to a determination that the value in the z-value field of the one or more of the plurality of nodes corresponding to the one or more graphic elements to be moved is front:

determining if a number of the one or more plurality of nodes corresponding to the one or more graphic elements to be moved is greater than a remainder of the nodes; and in response to a determination that the number of the one or more plurality of nodes corresponding to the one or more graphic elements to be moved is not greater than the remainder of the nodes, moving the one or more plurality of nodes corresponding to the one or more graphic elements to be moved in front of the remainder of nodes.

19. The non-transitory computer-readable storage medium of claim 13, wherein the reordering includes:

determining whether the value in the z-value field of the one or more of the plurality of nodes corresponding to the one or more graphic elements to be moved is front or back;

in response to a determination that the value in the z-value field of the one or more of the plurality of nodes corresponding to the one or more graphic elements to be moved is back:

determining if a number of the one or more plurality of nodes corresponding to the one or more graphic elements to be moved is greater than a remainder of the nodes; and in response to a determination that the number of the one or more plurality of nodes corresponding to the one or more graphic elements to be moved is greater than the remainder of the nodes, moving the remainder of nodes behind the one or more plurality of nodes corresponding to the one or more graphic elements to be moved.

20. The non-transitory computer-readable storage medium of claim 13, wherein the reordering includes:

determining whether the value in the z-value field of the one or more of the plurality of nodes corresponding to the one or more graphic elements to be moved is front or back;

in response to a determination that the value in the z-value field of the one or more of the plurality of nodes corresponding to the one or more graphic elements to be moved is front:

determining if a number of the one or more plurality of nodes corresponding to the one or more graphic elements to be moved is greater than a remainder of the nodes; and in response to a determination that the number of the one or more plurality of nodes corresponding to the one or more graphic elements to be moved is not greater than the remainder of the nodes, moving the one or more plurality of nodes corresponding to the one or more graphic elements to be moved behind the remainder of nodes.

* * * * *